United States Patent [19]

Brown, Jr. et al.

[11] Patent Number: 5,354,363
[45] Date of Patent: Oct. 11, 1994

[54] HEAVY METAL/PARTICULATE TRAP FOR HOT GAS CLEAN-UP

[76] Inventors: Jesse J. Brown, Jr.; Nancy R. Brown, both of 414 Miller St., Christiansburg, Va. 24073

[21] Appl. No.: 95,794

[22] Filed: Jul. 22, 1993

[51] Int. Cl.$^5$ .............................................. B01D 53/02
[52] U.S. Cl. ...................................... 95/134; 95/133; 95/148; 95/227; 95/228; 95/234; 96/143; 75/961
[58] Field of Search ........................ 55/244, 256, 269; 95/133, 134, 226–228, 234; 96/108, 143, 146; 75/688, 961; 423/210.5, DIG. 12

[56] References Cited

U.S. PATENT DOCUMENTS

| | | | |
|---|---|---|---|
| 3,193,987 | 7/1965 | Manes et al. | 55/72 |
| 3,634,067 | 1/1972 | Klein | 95/234 X |
| 3,647,358 | 3/1972 | Greenberg | 423/DIG. 12 |
| 3,788,838 | 1/1974 | Wenzel et al. | 95/234 X |
| 3,928,550 | 12/1975 | Seitzer | 95/234 X |
| 4,093,702 | 6/1978 | Merkl | 423/235 |
| 4,094,777 | 6/1978 | Sugier et al. | 210/32 |
| 4,308,037 | 12/1981 | Meissner et al. | 423/210.5 X |
| 4,548,621 | 10/1985 | Eriksson et al. | 95/234 X |
| 4,564,509 | 1/1986 | Shealy et al. | 423/210.5 |
| 4,695,447 | 9/1987 | Shultz | 423/659 |
| 4,814,152 | 3/1989 | Yan | 423/210 |
| 4,902,665 | 2/1990 | Elfline | 502/402 |
| 5,108,497 | 4/1992 | Gomez et al. | 75/688 X |

FOREIGN PATENT DOCUMENTS

| | | | |
|---|---|---|---|
| 0007856 | 2/1980 | European Pat. Off. | 75/961 |
| 0082989 | 7/1983 | European Pat. Off. | 95/133 |
| 1931481 | 10/1970 | Fed. Rep. of Germany | 95/234 |
| 2542595 | 4/1977 | Fed. Rep. of Germany | 95/234 |
| 2601826 | 7/1977 | Fed. Rep. of Germany | 95/234 |
| 53-010554 | 4/1978 | Japan | 95/226 |

OTHER PUBLICATIONS

Article from PERC/R1–76/5, by J. T. Yeh, et al, Pittsburgh Energy Research Center, "Removal of Toxic Trace Elements From Coal Combustion Effluent Gas" pp. 213–229.

Article from PB-273 236, by S. K. Friedlander of California Institute of Technology, "Emission Control In An Expanding Industry: Trace Metals From Coal Combustion", pp. 209–213.

*Primary Examiner*—Robert Spitzer
*Attorney, Agent, or Firm*—Whitham, Curtis, Whitham & McGinn

[57] ABSTRACT

A scrubber for industrial exhaust systems advantageously employs liquid gallium to adsorb vapor phase mercury as well as sub-micron sized particulates such as other trace metal constituents from a hot gas exhaust stream in an industrial exhaust system. The temperature of the liquid gallium is elevated for optimum adsorption efficiency, and subsequently lowered to separate the adsorbed mercury and other species.

10 Claims, 3 Drawing Sheets

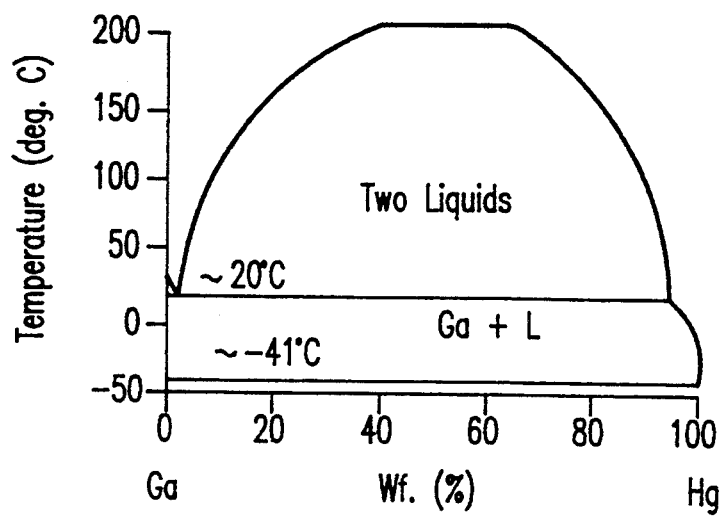
FIG.2A  MERCURY – GALLIUM PHASE DIAGRAM
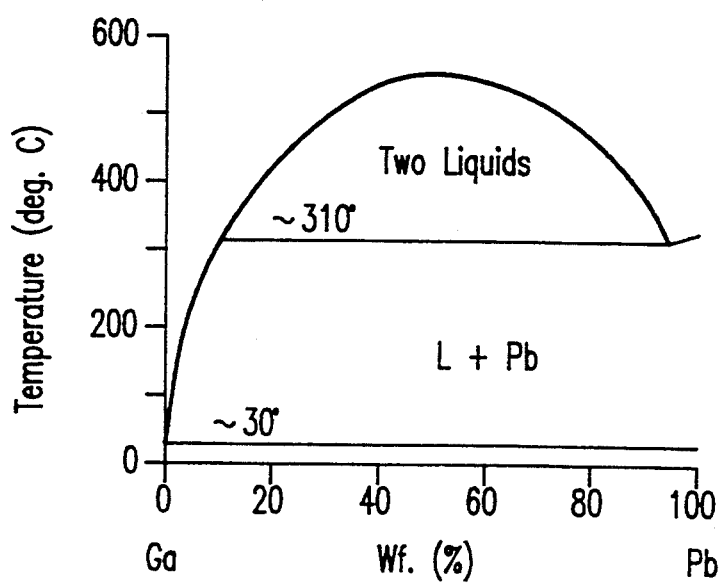
FIG.2B  LEAD – GALLIUM PHASE DIAGRAM

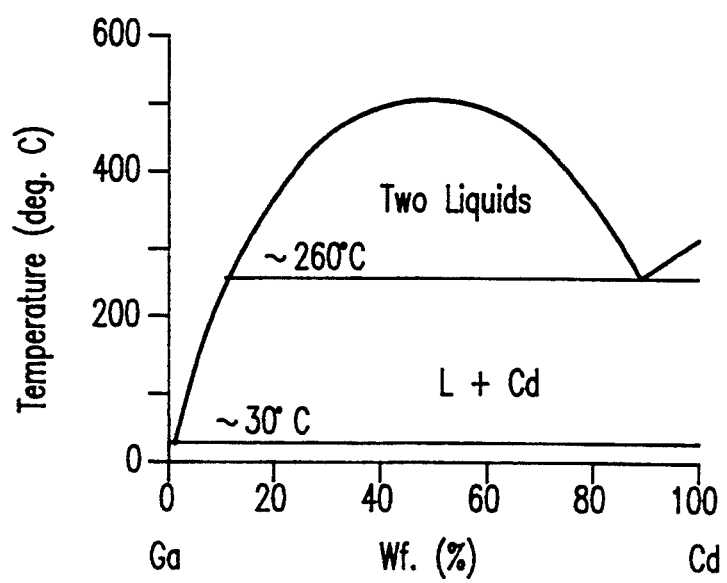
FIG.2C  CADMIUM – GALLIUM PHASE DIAGRAM

HEAVY METAL/PARTICULATE TRAP FOR HOT GAS CLEAN-UP

BACKGROUND OF THE INVENTION

1. Field of the Invention

The invention is generally related to devices and materials used to remove mercury and other heavy metals, particulate matter, as well as other solid, liquid and vapor components which may have an adverse environmental impact, from a hot gas stream generated from power plants, industrial exhaust systems, reaction vessels, waste incinerators, or other sources.

2. Description of the Prior Art

To prevent adverse environmental consequences, the effluent gaseous stream from power plants, industrial exhaust systems, reaction vessels, waste incinerators, and other sources, must be cleaned-up to remove harmful and/or toxic constituents. The clean-up operation is often referred to as "scrubbing", and devices used to accomplish the clean-up are referred to as "scrubbers".

Through the Clean Air Act of 1990, the Environmental Protection Agency has instituted legislation to control emissions of 189 air toxins, including mercury, which result from various industries. A considerable amount of research has been focussed on removing the major pollutants, $SO_x$, $NO_x$, and primary particulates, from gaseous streams; however, trace metals such as mercury, lead, zinc, nickel, molybdenum, cadmium, gallium, beryllium, antimony, copper, and vanadium, and other constituents such as chlorine, fluorine, and arsenic, are produced by the combustion of fossil fuels such as coal and can pose significant health hazards. Conventional flue gas clean-up systems such as cyclones, electrostatic precipitators, and filter bags can effectively remove large fly ash particles, but are generally ineffective in filtering trace metals which exist in the fine particulate or vapor phase. With particular reference to mercury produced during coal combustion, only a small portion of flue gas mercury will condense on particulate and be removed through scrubber action by passing the effluent through fabric filters or the like as part of the flue gas desulfurization process. 80-90% of the mercury will remain in the vapor phase and will pass through the sulfur scrubber and will be emitted from exhaust stack into the ambient environment. Chlorine and fluorine released during fossil fuel combustion or other reaction processes also remain in the vapor phase and are discharged directly into the environment without being removed from the exhaust stream. In addition, lead, antimony, copper, vanadium, zinc, arsenic, beryllium, cadmium, gallium, molybdenum, nickel, etc., are byproducts of fossil fuel (coal) combustion and will form sub-micron particles through nucleation processes. Sub-micron particles are too small to be removed by conventional industrial exhaust gas scrubbers. The sub-micron particles pose a significant health hazard because they are respirable (e.g., most asthma treating drugs are administered as sub-micron particles).

Hence, there is a need for a scrubber that can effectively remove vapor phase trace metals such as mercury and sub-micron particles from the exhaust streams generated from power plants, industrial exhaust systems, reaction vessels, waste incinerators, or other sources.

U.S. Pat. No. 4,695,447 to Shultz discloses the use of molten aluminum in the treatment of hazardous wastes. In operation, mercury oxides and sulfides are reduced to elemental mercury which is captured via condensation.

U.S. Pat. No. 4,814,152 to Yan discloses a chemisorbent composition and process from removing elemental mercury from a gas. The chemisorbent composition contains a solid support, elemental sulfur, and at least one metal which catalyzes the reaction $2\ Hg + S_2 \rightarrow 2\ HgS$.

U.S. Pat. No. 4,902,665 to Elfline discloses removing heavy metals from waste water by adding a water insoluble carboxylated cellulose transition metal oxide to the water to precipitate the heavy metal onto the cellulose.

U.S. Pat. No. 4,564,509 to Shealy et al. shows bubbling reactant gases through a ternary melt to remove oxygen, water vapor, and other oxygen bearing gas species.

U.S. Pat. No. 4,094,777 to Sugier et al. discloses the use of a copper sulfide containing solid mass to remove mercury from a gas or a liquid.

U.S. Pat. No. 4,093,702 to Merkl discloses a method of removing gaseous pollutants such as NO, $NO_2$, $SO_2$, $SO_3$ and halogens, from a stream of gas by contacting the gas stream with an aqueous medium which contains an activated form of aluminum.

U.S. Pat. No. 3,193,987 to Manes et al. shows impregnating activated carbon with metals which will amalgamate with mercury.

Yeh et al., Report PERC/RI-76/5, *Trace Contaminants in Coal*, Ed. S. Torrey, Noyes Data Corporation, 1978, presented investigation results using high efficiency filter bags to remove mercury vapor and trace metal particulate from coal combustion gases. Although relatively high mercury filtration efficiencies were achieved under certain conditions, in general, the success of this method depends upon high levels of carbon in the fly ash. High levels of carbon are indicative of incomplete combustion. In addition, high filter loadings were required, which increases the pressure drop across the filter, and consequently, increases the power requirement of the forced-draft or induced draft fan in a conventional power plant. Finally, a lower flue gas temperature was shown to be advantageous with the filter bags, although there is a practical minimum operational temperature of 270° F., which is the dew point of acid gases.

The use of activated carbon as an adsorbent is used in many industrial clean-up systems. Activated carbon has been investigated for mercury removal in coal combustion and municipal waste disposal environments. Geiser et al., "Control of Mercury from MSW Combustors by Spray Dryer Absorption Systems in Activated Carbon Injection, Municipal Waste Combustion Conference, Williamsburg, Va., Mar. 30-Apr. 2, 1993, reported that using activated carbon in flue gas clean-up was inconsistent and complicated.

Friedlander, Report PB-273 236, *Trace Contaminants in Coal*, Ed. S. Torrey, Noyes Data Corporation, 1978, discussed the use of electrostatic precipitators in exhaust gas clean-up. It was reported that electro-static precipitators are often ineffective at filtering sub-micron (0.1-1 $\mu$m) particulate from exhaust gas streams, and suggested that increases in either the collection plate area or power input would be required to significantly enhance the filtration capability of sub-micron particles.

SUMMARY OF THE INVENTION

It is an object of this invention to provide an effective scrubber for hot gas streams generated from power plants, industrial exhaust systems, reaction vessels, waste incinerators, or other sources, which can remove vapor phase mercury and sub-micron particulate matter including other heavy metals and vapor phase constituents.

It is another object of this invention to provide a scrubber which can be re-generated for effective use and which can be used to re-claim mercury and other heavy metals by simple temperature control.

It is yet another object of this invention to use molten gallium metal in a scrubber for hot gas streams.

According to the invention, molten gallium metal is used to remove mercury and other heavy metals, as well as other vapor phase constituents and sub-micron particulates, from hot gas streams produced from the combustion of fossil fuels such as coal, the incineration of industrial, hospital, or domestic wastes, or from other sources.

BRIEF DESCRIPTION OF THE DRAWINGS

The foregoing and other objects, aspects and advantages will be better understood from the following detailed description of the preferred embodiments of the invention with reference to the drawings, in which:

FIGS. 2a–c are phase diagrams of gallium with mercury, lead, and cadmium, respectively.

DETAILED DESCRIPTION OF THE PREFERRED EMBODIMENTS OF THE INVENTION

This invention particularly contemplates the use of molten gallium metal to remove vapor phase and submicron particle constituents from the hot gas stream effluent of industrial exhaust systems, especially those that result from the combustion of fossil fuels such as coal and the incineration of industrial, hospital, and domestic wastes, and other sources. Table 3 presents the physical properties of gallium metal and Table 4 presents vapor pressure versus temperature data for liquid gallium.

TABLE 3

| Physical Properties of Elemental Gallium | |
|---|---|
| Property | Value |
| Density (g/cc) | |
| 20° C. (sol) | 5.9070 |
| 29.65° C. (liq) | 5.9037 |
| 29.80° C. (liq) | 6.0948 |
| 1100.00° C. (liq) | 5.4450 |
| Melting Point (°C.) | 29.78 |
| Boiling Point (°C.) | 2237 |
| Latent Heat of Fusion (cal/g) | 19.16 |
| Thermal Conductivity (29° C.) (cal/sq. cm./cm./sec/°C.) | .07–.09 |
| Hardness (Moh) | 1.5 |
| Crystal Structure | Orthorhombic |
| Closest approach of Atoms (A) | 2.437 |

TABLE 4

| Vapor Pressure of Liquid Gallium | | |
|---|---|---|
| Temp. (° C.) | Vapor Pressure (mm Hg) | Gallium Vaporizing (ppm) |
| 633 | 0.0000001 | 0.0008 |
| 697 | 0.000001 | 0.008 |
| 771 | 0.00001 | 0.08 |
| 859 | 0.0001 | 0.8 |
| 965 | 0.001 | 8.0 |
| 1093 | 0.01 | 80.0 |
| 1248 | 0.1 | 800.0 |
| 1443 | 1.0 | 8,000.0 |
| 1726 | 100.0 | 8,000,000.0 |

Table 3 shows that gallium exists in liquid phase from approximately 30° C. to 2,000° C., and Table 4 shows that gallium has a low vapor pressure at high temperatures (note that vapor pressure at approximately 1,400° C. is only 1 mm Hg).

Liquid gallium has been identified as being useful for taking into solution a large number of other elements, especially mercury and related heavy metals. Adsorbing a constituent of a gaseous stream into a liquid solution can be referred to as a "sponge effect". The sponge effect of liquid gallium applies to all states of matter (solids, liquids, and vapors). Hence, liquid gallium can be used as a scrubber in an industrial exhaust system for mercury vapor and for sub-micron particles of other trace metals. Liquid gallium also wets most oxides; therefore, it will be able to trap ash particles from an industrial exhaust system since they are mostly composed of oxides.

In order to substantiate this concept, tests were conducted in which 0.6 grams of mercury vapor was bubbled through liquid gallium at 100° C. Subsequent measurement revealed nearly a 0.6 gram weight increase in the liquid gallium, thus indicating a strong affinity for vapor phase mercury.

Figure 1B:
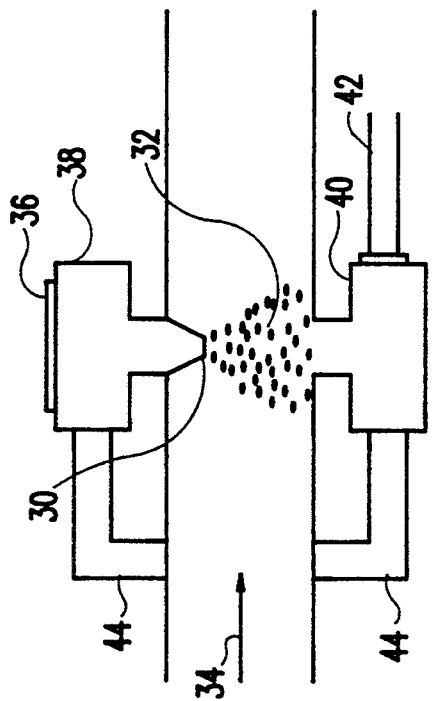
FIGS. 1a–c are schematic diagrams of alternative scrubber designs, each of which includes gallium metal that can remove vapor phase mercury and sub-micron particulate matter including other heavy metals and vapor phase constituents from a hot gas stream effluent.
Figure 1C:
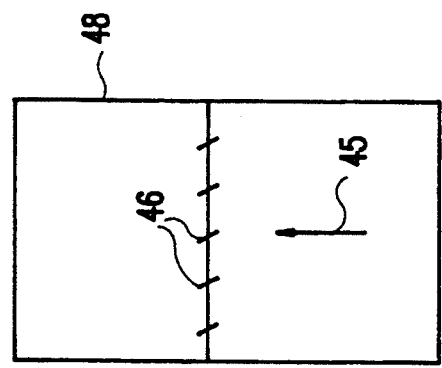
Figure 1A:
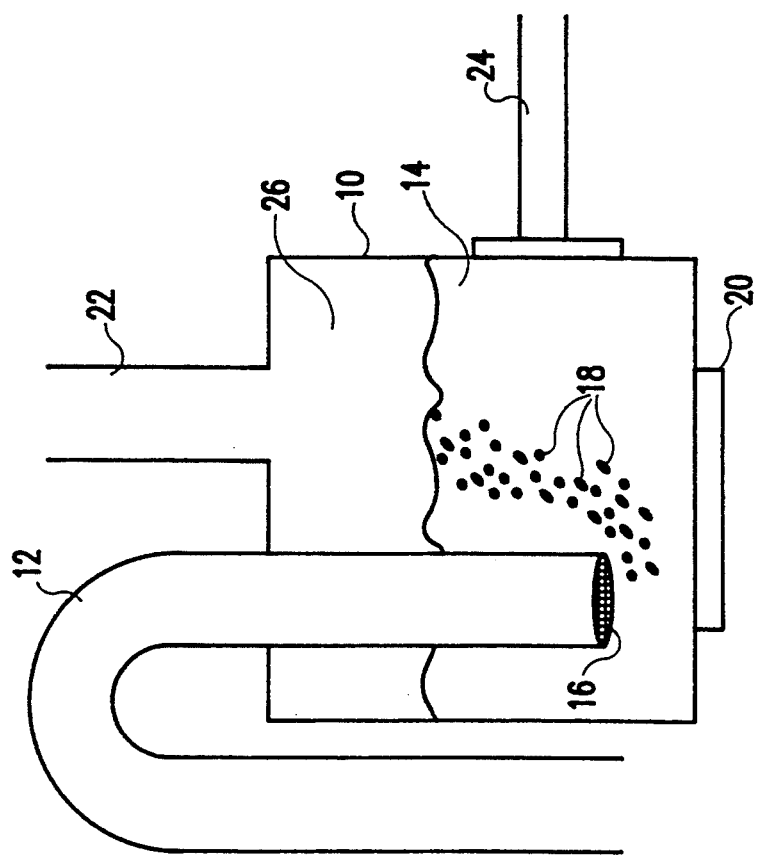

FIG. 1a shows an example of a gallium scrubber used for treating industrial hot gas exhausts. Exhaust gas streams are transported to the scrubber compartment 10 via exhaust line 12. The exhaust gas streams are advantageously treated with filters and other separators to remove sulphur and nitrogen pollutants prior to a secondary cleanup in the scrubber compartment 10. The exhaust gas stream from coal combustion can be as high as 1,000° C. or more. Similar exhaust gas temperatures are found in incineration and other industrial environments. The exhaust gas is bubbled through liquid gallium 14 in the scrubber compartment 10. A screen or atomizer 16 or other dispersive element can be positioned at the end of exhaust line 12 to enhance the creation of smaller bubbles 18. Smaller bubbles 18 are preferably because they provide greater interfacial surface area between combustion gases and the gallium 14 and facilitate the transport of mercury across the interface. However, the creation of small bubbles will also increase the pressure drop across the scrubber compartment 10, which may decrease the performance of conventional power plants which require large forced draft fans to pull the flue gas through the boiler and exhaust clean-up systems. Therefore, the bubble size should be optimized to balance mercury and other constituent removal with power plant performance.

FIGS. 1b and 1c show other examples of gallium scrubber systems which can be used for treating exhausts to remove mercury and other constituents. FIG. 1b shows a scrubber system where an atomizer 30 injects a spray 32 of molten gallium into an exhaust stream 34 to allow the molten gallium to absorb mercury, lead, cadmium, and other particulate matter (both organic and inorganic). The atomizer 30 a nozzle, vortex generating device, or other mechanism for finely dispersing droplets of liquid gallium to create spray 32. A heating element 36 connected to chamber 38 can be used to selectively heat gallium to a desired temperature prior to the spray 32 being injected into the exhaust stream 34. The spray 32 is collected in chamber 40, and the absorbed constituents can be removed by temperature control as described below and discharged through conduit 42. The re-generated gallium is then recycled to chamber 38 via conduit 44 for further use in removing constituents from gaseous stream 34. FIG. 1c shows a gaseous stream 45 being pumped past a plurality of baffles 46 in an exhaust stack 48. Gallium is coated on the baffles 46 and is maintained in a molten state. Because gallium is "sticky", especially to ceramics, it will remain on the baffles 46 even at a slight incline. The baffles 46 could be heated; however, the heat of the gaseous stream 45 may also be used for maintaining the gallium in a molten conditions. The baffles 46 could be removed periodically to separate absorbed constituents from the gallium metal; thereby re-generating the baffles 46 for continued use.

The scrubber systems of FIGS. 1a–c are shown for exemplary purposes only. It should be understood that the many other scrubber designs could be made which utilize molten gallium for removal of harmful constituents (mercury, lead, cadmium, etc.) from exhaust streams.

FIGS. 2a–c demonstrate the adsorption efficiency of a molten gallium scrubber increases with increasing temperature. FIG. 2a shows that mercury is 100% soluble in gallium above 200° C., while FIGS. 2b and 2c show that lead and cadmium are 100% soluble in gallium above 600° C. With reference back to Table 2, it can be seen that liquid gallium has a very low vapor pressure between 600° C. and 1,400°, and that very small quantities of gallium are vaporized between 600° C. and 900° C. Therefore, liquid gallium in the scrubber of the present invention can operated above 600° C. to adsorb all the mercury, lead, and cadmium in an exhaust gas effluent. Examination of the phase diagrams of a wide variety of other constituents including chlorine, fluorine, antimony, copper, vanadium, zinc, arsenic, beryllium, molybdenum, and nickel, will reveal that many species can be adsorbed by liquid gallium maintained at an elevated temperature.

The phase diagrams of FIGS. 2a–c demonstrate that mercury, lead, and cadmium, as well as other vapor and particulate constituents in a hot gas stream can be completely adsorbed by high temperature liquid gallium, and then safely and effectively separated and collected at lower temperatures. FIG. 2a shows that a large two liquid or immiscibility region exists between 20° C. and 200° C. Below 20° C., the gallium is crystallized, leaving pure liquid mercury. FIGS. 2b and 2c show similar features for lead and cadmium.

By referring to both FIG. 1a and FIG. 2a, a temperature control element 20 is used to control the temperature of the liquid gallium 14 in the scrubber compartment 10. Mercury within bubbles 18 pass through the interface between the gallium and the bubble and are adsorbed by the liquid gallium. In order to adsorb all the mercury vapor in an exhaust gas effluent, the liquid gallium 14 in the scrubber compartment 10 should be maintained above 200° C.; however, the preliminary experiment described above demonstrated a strong affinity for mercury at temperatures as low as 100° C. The temperature control element 20 can be used to adjust the temperature of the gallium 14 to any desired level for optimum operation of the power plant and optimum absorption of particular species from the exhaust stream. Gas from bubbles 18 is then discharged through treated effluent line 22.

Separating the adsorbed mercury from the liquid gallium can be accomplished by simple temperature control of the gallium 14 in the scrubber compartment 10. By lowering the temperature to 20° C., pure gallium crystallizes to leave solid gallium and almost pure liquid mercury in the scrubber compartment 10. The mercury can be recovered using a reclaiming conduit 24 connected to the scrubber compartment 10 or other means.

Separation of the adsorbed species may also be accomplished by lowering the temperature to a point where the liquid gallium and the adsorbed species, which has been changed from vapor to liquid phase, are immiscible, and then withdrawing the adsorbed species from above or below the liquid gallium using the reclaiming conduit 24.

In operation, the gallium 14 in the scrubber compartment should ideally be maintained at a temperature to adsorb all species of interest. Hence, if mercury is to be adsorbed, the gallium 14 temperature should be in excess of 200° C., and if lead is to be adsorbed, the gallium 14 temperature should be in excess of 600° C. If the gallium temperature is below that shown in the phase diagrams of FIGS. 2a–c, the adsorption will not be 100% efficient and some portion of the species of interest will pass through the scrubber compartment 10 without being adsorbed and reclaimed. Periodically, the liquid gallium 14 in the scrubber compartment 10 will be "re-generated" or restored to its optimum efficiency by reclaiming the adsorbed species from the liquid gallium. As described above, this is accomplished by lowering the temperature of the liquid gallium 14 using the temperature control element 20 to a point where the adsorbed species is immiscible with liquid gallium or where the gallium crystallizes to a solid. The adsorbed species is then reclaimed using the conduit 24 or by other means.

Preferably, the air space 26 above the liquid gallium will be maintained in a non-oxidative state. In an oxidative environment, liquid gallium may be converted to gallium-oxide, which is a solid white powder. Conversion to gallium-oxide would alter the adsorption potential of the scrubber and be detrimental to its performance. An inert gas such as nitrogen or carbon dioxide could be supplied to the air space 26 to prevent the environment from becoming oxidative.

With reference to FIGS. 1b and 1c, it can be seen that the gallium is used for absorbing mercury and other harmful constituents from an exhaust by a similar mechanism to that described in conjunction with FIG. 1a. In particular, the spray 32 of liquid gallium in FIG. 1b provides abundant surface area of molten gallium to enhance the interfacial interaction of mercury and other constituents with the gallium. In addition, FIG. 1c shows the transport of exhaust gas across baffle plates 46 which have molten gallium spread over their surfaces to allow for more surface interaction between the gas stream and the molten gallium. Both designs allow for re-generation of liquid gallium by temperature control operations.

While the invention has been described in terms of its preferred embodiments, those skilled in the art will recognize that the invention can be practiced with modification within the spirit and scope of the appended claims.

We claim:

1. A method for cleaning up a hot gas stream, comprising the steps of:
   delivering a gaseous stream to liquid gallium metal;
   adsorbing constituents from said gaseous stream into a mixture with said liquid gallium metal; and
   separating said constituents from said mixture.

2. The method of claim 1 wherein said steps of adsorbing and separating are accomplished by adjusting the temperature of said liquid gallium metal.

3. The method of claim 1 wherein said step of separating includes the step of converting said liquid gallium metal to a solid.

4. The method of claim 1 wherein said constituents are selected from the group consisting of mercury, lead, and cadmium.

5. The method of claim 4 wherein said constituent is mercury.

6. A hot gas clean-up system; comprising:
   gallium metal;
   means for containing said gallium metal;
   means for delivering a gaseous stream to said means for containing said gallium metal;
   means for controlling the temperature of said gallium metal, said means for controlling being capable of adjusting the temperature of said gallium metal to allow for
   (i) adsorbing constituents from said gaseous stream into a liquid mixture with said gallium metal, and
   (ii) separating adsorbed constituents from said liquid mixture; and
   means for collecting said adsorbed constituents.

7. The hot gas clean-up system of claim 6 further comprising a means for dispersing said gaseous stream connected to said means for delivering said gaseous stream so that fine bubbles are created in said gallium metal when said gallium metal is in a liquid phase.

8. The hot gas clean-up system of claim 6 wherein said means for controlling the temperature of said gallium metal can convert said gallium metal between a solid and a liquid.

9. The hot gas clean-up system of claim 6 wherein said means for controlling the temperature of said gallium metal can adjust the temperature of said gallium metal to a desired level selected for optimally removing a constituent from said gaseous stream.

10. The hot gas clean-up system of claim 9 wherein said constituent is selected from the group consisting of mercury, lead, and cadmium.

* * * * *